(12) United States Patent
Koo

(10) Patent No.: US 7,821,612 B2
(45) Date of Patent: Oct. 26, 2010

(54) COLOR FILTER ARRAY PANEL AND LIQUID CRYSTAL DISPLAY INCLUDING THE SAME

(75) Inventor: Dong-Seong Koo, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 398 days.

(21) Appl. No.: 11/322,296

(22) Filed: Dec. 29, 2005

(65) Prior Publication Data

US 2006/0158599 A1 Jul. 20, 2006

(30) Foreign Application Priority Data

Jan. 18, 2005 (KR) .................. 10-2005-0004626

(51) Int. Cl.
*G02F 1/1339* (2006.01)

(52) U.S. Cl. .................. 349/155; 349/156; 349/157; 349/106; 349/110

(58) Field of Classification Search .............. 349/106, 349/155–157, 110
See application file for complete search history.

(56) References Cited

U.S. PATENT DOCUMENTS

| | | | |
|---|---|---|---|
| 4,522,414 A | 6/1985 | Schulte | |
| 5,671,030 A | 9/1997 | Ohnuma et al. | |
| 5,978,061 A * | 11/1999 | Miyazaki et al. | 349/155 |
| 6,124,917 A | 9/2000 | Fujioka et al. | |
| 6,147,729 A | 11/2000 | Kurauchi et al. | |
| 6,281,960 B1 * | 8/2001 | Kishimoto et al. | 349/156 |
| 6,414,733 B1 * | 7/2002 | Ishikawa et al. | 349/110 |
| 6,493,050 B1 * | 12/2002 | Lien et al. | 349/106 |
| 6,642,988 B2 * | 11/2003 | Matsuyama et al. | 349/156 |
| 6,683,670 B2 * | 1/2004 | Chung et al. | 349/153 |
| 6,743,650 B2 * | 6/2004 | Hirakata et al. | 438/30 |
| 6,819,391 B2 * | 11/2004 | Kim et al. | 349/157 |
| 7,053,971 B2 * | 5/2006 | Arai | 349/151 |
| 7,061,569 B2 * | 6/2006 | Yun et al. | 349/158 |
| 7,433,004 B2 * | 10/2008 | Tsubata et al. | 349/106 |
| 2003/0112404 A1 | 6/2003 | Kim | |
| 2004/0017538 A1 * | 1/2004 | Yun et al. | 349/187 |
| 2004/0183990 A1 | 9/2004 | Guang et al. | |
| 2004/0201799 A1 * | 10/2004 | Nakayoshi et al. | 349/106 |
| 2004/0239840 A1 * | 12/2004 | Ikeda et al. | 349/106 |
| 2004/0252271 A1 | 12/2004 | Song | |
| 2005/0243263 A1 * | 11/2005 | Yoon | 349/156 |
| 2005/0253994 A1 * | 11/2005 | Kamijima et al. | 349/155 |

FOREIGN PATENT DOCUMENTS

| | | | |
|---|---|---|---|
| JP | 01015719 A | * | 1/1989 |
| JP | 06-110063 | | 4/1994 |
| JP | 08-152654 | | 6/1996 |
| JP | 10-048601 | | 2/1998 |
| JP | 10-232404 | | 9/1998 |
| JP | 10239513 A | | 9/1998 |

(Continued)

*Primary Examiner*—David Nelms
*Assistant Examiner*—Thanh-Nhan P Nguyen
(74) *Attorney, Agent, or Firm*—Innovation Counsel LLP

(57) ABSTRACT

A color filter array panel includes a panel having a display area and a peripheral area surrounding the display area, the display area including a plurality of color filters. A first spacer is formed in the peripheral area and is constructed from the same material as that of at least one of the color filters.

7 Claims, 5 Drawing Sheets

FOREIGN PATENT DOCUMENTS

| | | |
|---|---|---|
| JP | 11-281962 | 10/1999 |
| JP | 2000-162617 | 6/2000 |
| JP | 2002-031814 | 1/2002 |
| JP | 2002-189224 | 7/2002 |
| JP | 2002-341358 | 11/2002 |
| KR | 1999-0084317 | 12/1999 |
| KR | 10-0379288 | 3/2003 |
| KR | 2003-0049384 | 6/2003 |
| KR | 2004-00034899 | 4/2004 |
| WO | 2004055585 A1 | 7/2004 |

* cited by examiner

COLOR FILTER ARRAY PANEL AND LIQUID CRYSTAL DISPLAY INCLUDING THE SAME

BACKGROUND OF THE INVENTION (a) Field of the Invention

The present invention relates to a color filter array panel and a liquid crystal display including the same.

(b) Description of Related Art

A liquid crystal display (LCD) is one type of flat panel display which is used widely, and it includes two panels provided with field generating electrodes and polarizers and a liquid crystal (LC) layer interposed therebetween. Additionally, the LCD includes a sealant for preventing the LC layer from leaking from the display and spacers for maintaining a constant gap between the two panels.

As the LCDs increase in size, a peripheral area surrounding the display becomes narrower in order to increase manufacturing yield.

Thus, a structure in which driving circuits such as a gate driver, are integrated together with switching elements has been utilized. Signal lines for transmitting signals required to operate the gate driver, for example, a gate-off voltage, a clock signal, and an initializing signal are disposed along an edge of the panel together with the gate driver. Additionally, connecting lines for transmitting the signals to the gate driver intersect the signal lines.

In the manufacture of an LCD provided with the gate driver integrated on the panel, two panels are made separately, and then the two panels are attached using an adhesive.

However, the peripheral area of the LCD is narrow and thus the space available to apply the sealant is also narrow. Accordingly, the sealant is typically applied on the gate driver, and spacers, such as glass fibers or soft sphere shaped structures, are included in the sealant to avoid damaging the signal lines of the gate driver.

Damage of the signal lines causes an operation of the LCD to be poor, as also results in lower reliability and manufacturing yield.

Processes for including the spacer in the sealant are complicated. Moreover, when the sealant is applied using a syringe, poor emission of sealant from the syringe often occurs because of the spacer. Additionally, a process for removing bubbles included in the sealant is performed for a long time, and thus the productivity decreases.

SUMMARY OF THE INVENTION

An object of the present invention is to provide a color filter array panel and a liquid crystal display including the same that is capable of solving such conventional problems.

A color filter array panel is provided, which includes: a panel having a display area and a peripheral area surrounding the display area; a plurality of color filters formed in the display area; and a first spacer formed in the peripheral area and made of the same material as at least one of the color filters.

The color filter array panel may further include a common electrode formed on the color filters and the first spacer.

Each of the color filters may represent one of red, green, and blue colors.

Herein, the first spacer may include at least two layers made of a material identical to that of the red, the green, and the blue color filters.

The color filter array panel may further include a second spacer formed in the display area.

The color filter array panel may further include a third spacer formed on the first spacer and made of a material identical to that of the second spacer.

The color filter array panel may further include a light blocking member formed between the panel and the color filters and the first spacer, with openings at positions corresponding to the color filters.

A liquid crystal display is provided, which includes: a thin film array panel comprising a first substrate provided with a driver and a display area, gate lines formed in the display area, data lines intersecting the gate lines, thin film transistors connected to the gate lines and the data lines, pixel electrodes connected to the thin film transistors, and circuits formed on the drivers and connected to the gate lines;

a color filter array panel comprising a second substrate opposite to the first substrate, a plurality of color filters formed at positions corresponding to the display area, and a first spacer formed at position corresponding to the driver; and liquid crystal interposed between the color filter array panel and the thin film transistor panel.

The liquid crystal display may further include a common electrode formed on the color filters and the first spacer.

The liquid crystal may be sealed by a sealant disposed on the first spacer.

Each of the color filters may represent one of red, green, and blue colors.

The first spacer is formed by depositing a material identical to at least two materials of the red, the green, and the blue color filters.

The liquid crystal display may further include a second spacer formed on the common electrode corresponding to the display area.

The liquid crystal display may further include a third spacer formed on the first spacer and made of a material identical to that of the second spacer.

The liquid crystal display may further include a light blocking member formed between the second substrate and the color filters and the first spacer, with openings at positions corresponding to the color filters.

BRIEF DESCRIPTION OF THE DRAWINGS

The present invention will become more apparent by reference to the description of the embodiments and the accompanying drawings, in which.

DETAILED DESCRIPTION OF EMBODIMENTS

Figure 1:
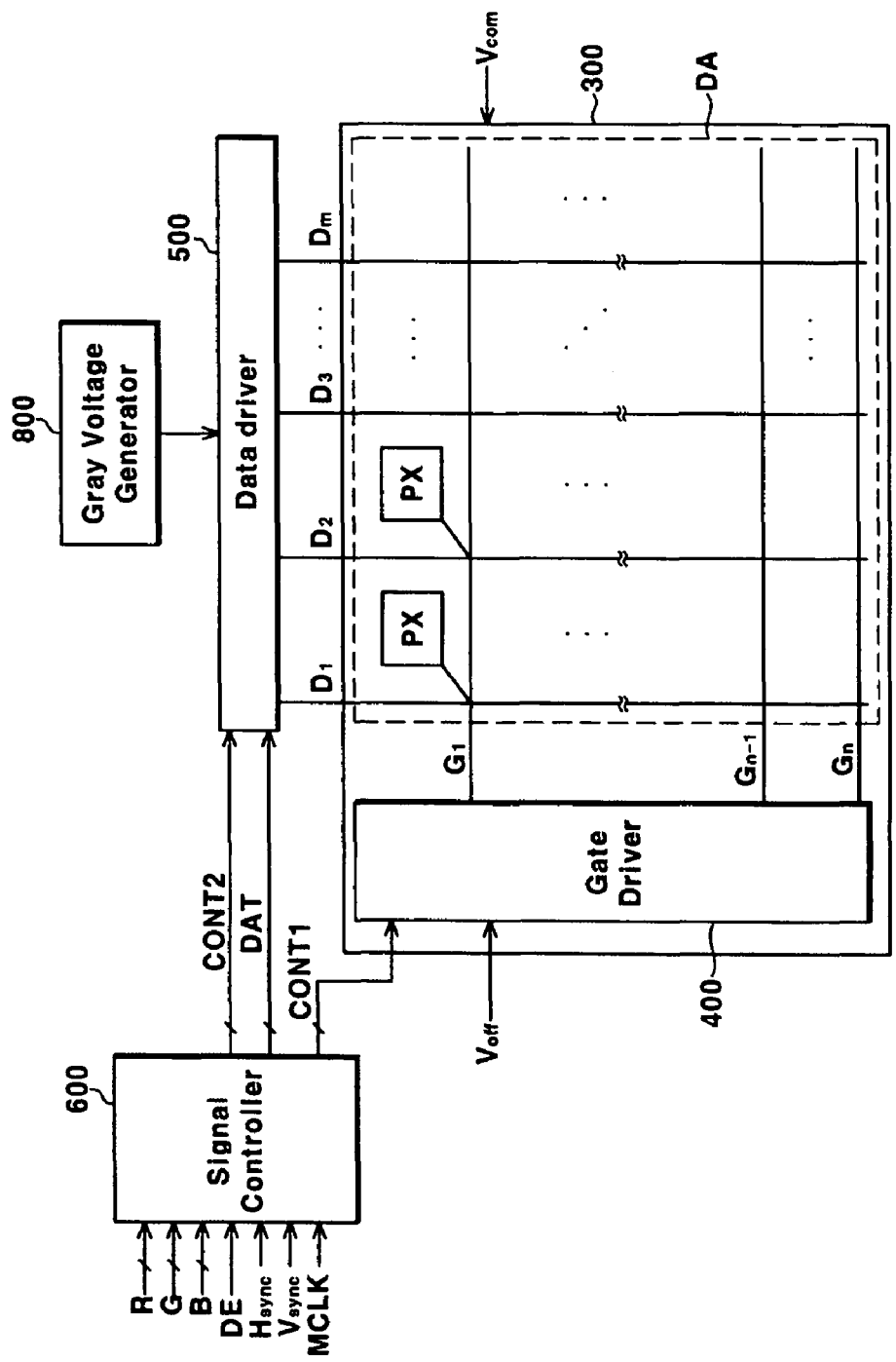
FIG. 1 is a block diagram of an LCD device according to an exemplary embodiment of the present invention.

The present invention is described more fully below with reference to the accompanying drawings, in which preferred embodiments of the inventions invention are shown. This invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, film, region, substrate, or panel is referred to as being "on" another element, it can be directly on the other element or intervening elements may also be present. In contrast, when an element is referred to as being "directly on" another element, there are no intervening elements present.

Figure 2:
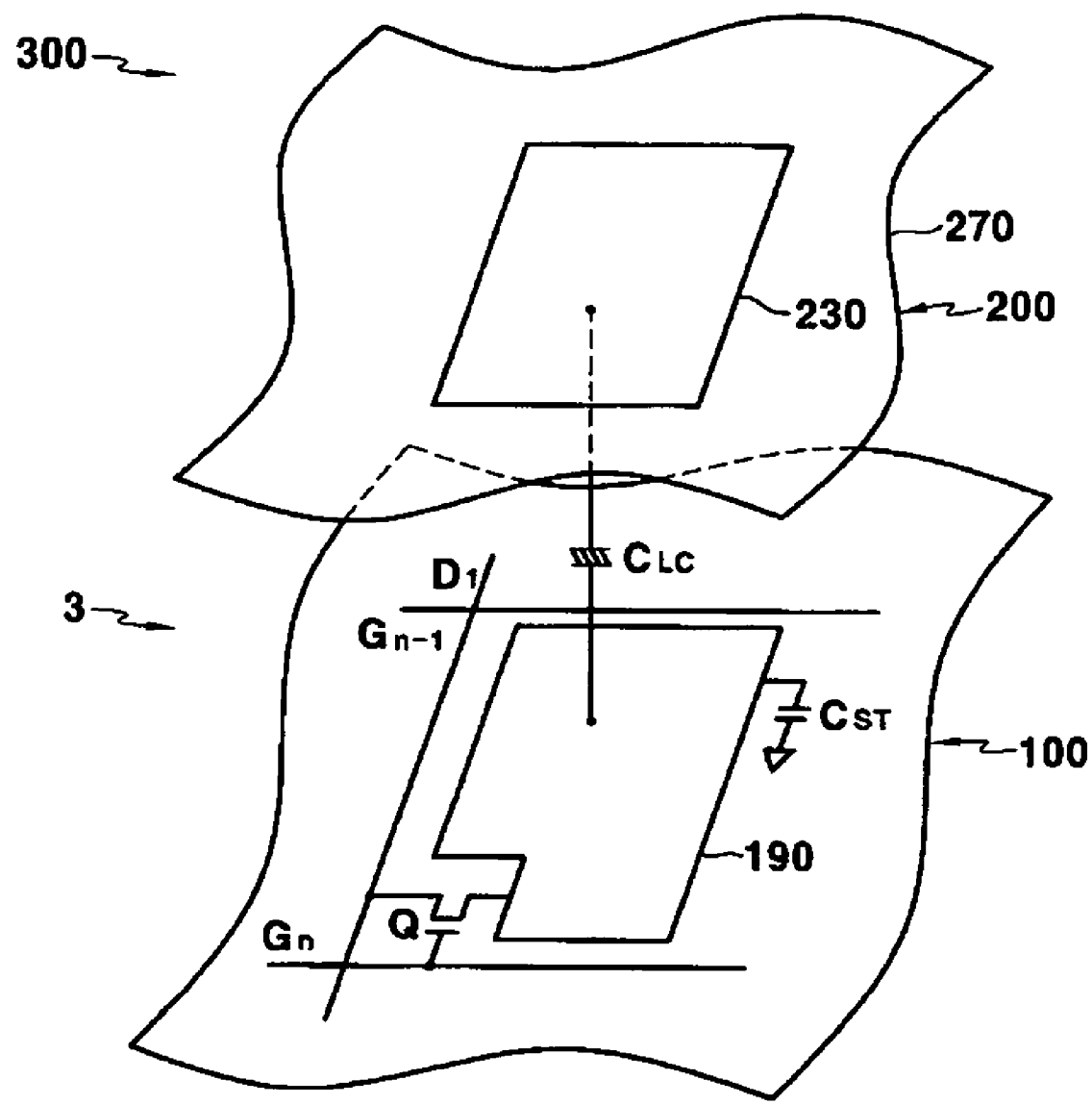
FIG. 2 illustrates a structure and an equivalent circuit diagram of a pixel of an LCD according to an exemplary embodiment of the present invention.

FIG. 1 is a block diagram of an LCD according to an exemplary embodiment of the present invention, and FIG. 2 illustrates a structure and an equivalent circuit diagram of a pixel of an LCD according to an exemplary embodiment of the present invention.

Referring to FIG. 1, an LCD according to an embodiment of the present invention includes an LC panel assembly 300, a gate driver 400 and a data driver 500 connected thereto, a gray voltage generator 800 connected to the data driver 500, and a signal controller 600 controlling the above-described elements.

The LC panel assembly 300 includes a plurality of display signal lines $G_1$-$G_n$ and $D_1$-$D_m$, and a plurality of pixels PX that are connected thereto and form a display area DA and arranged substantially in a matrix structure, and a gate driver 400.

The panel assembly 300 includes a lower panel 100, and an upper panel 200 and a liquid crystal (LC) layer 3 interposed therebetween, as shown in FIG. 2.

The display signal lines $G_1$-$G_n$ and $D_1$-$D_m$ are provided on the lower panel 100 and include a plurality of gate lines $G_1$-$G_n$ transmitting gate signals (called scanning signals) and a plurality of data lines $D_1$-$D_m$ transmitting data signals. The gate lines $G_1$-$G_n$ extend substantially in a row direction and they are substantially parallel to each other, while the data lines $D_1$-$D_m$ extend substantially in a column direction and they are substantially parallel to each other.

Each pixel PX includes a switching element Q connected to the display signal lines $G_1$-$G_n$ and $D_1$-$D_m$, and an LC capacitor $C_{LC}$ and a storage capacitor $C_{ST}$ that are connected to the switching element Q. Use of the storage capacitor $C_{ST}$ is optional.

The switching element Q, which may be a TFT, is provided on the lower panel 100 and has three terminals: a control terminal connected to one of the gate lines G1-Gn; an input terminal connected to one of the data lines $D_1$-$D_m$; and an output terminal connected to the LC capacitor $C_{LC}$ and the storage capacitor $C_{ST}$.

The LC capacitor $C_{LC}$ includes a pixel electrode 190 provided on the lower panel 100, a common electrode 270 provide on the upper panel 200, and the LC layer 3 as a dielectric between the electrodes 190 and 270. The pixel electrode 190 is connected to the switching element Q, and the common electrode 270 covers the entire surface of the upper panel 100 and is supplied with a common voltage Vcom. Alternatively, both the pixel electrode 190 and the common electrode 270, which have shapes of bars or stripes, may be provided on the lower panel 100.

The storage capacitor $C_{ST}$ is an auxiliary capacitor for the LC capacitor $C_{LC}$. The storage capacitor $C_{ST}$ includes the pixel electrode 190 and a separate signal line (not shown), which is provided on the lower panel 100, overlaps the pixel electrode 190 via an insulator, and is supplied with a predetermined voltage such as the common voltage Vcom. Alternatively, the storage capacitor $C_{ST}$ can be implemented using pixel electrode 190 and an adjacent gate line, also referred to as a previous gate line, which overlaps the pixel electrode 190 via an insulator.

For a color display, each pixel PX uniquely represents one of three primary colors such as red, green, and blue colors (spatial division) or sequentially represents the three primary colors in time (temporal division), thereby obtaining a desired color. FIG. 2 shows an example of the spatial division in which each pixel includes a color filter 230 representing one of the three primary colors in an area of the upper panel 200 facing the pixel electrode 190. Alternatively, the color filter 230 can be provided on or under the pixel electrode 190 on the lower panel 100.

A pair of polarizers (not shown) for polarizing light are attached on outer surfaces of the lower and upper panels 100 and 200 of the panel assembly 300.

Referring back to FIG. 1, a gray voltage generator 800 generates one set or two sets of gray voltages related to a transmittance of the pixels PX. When two sets of the gray voltages are generated, the gray voltages in one set have a positive polarity with respect to the common voltage Vcom, while the gray voltages in the other set have a negative polarity with respect to the common voltage Vcom.

The gate driver 400 synthesizes the gate-on voltage Von and the gate-off voltage Voff to generate gate signals for application to the gate lines $G_1$-$G_n$. The gate driver is a shift register, which include a plurality of stages in a line. The gate driver 400 is formed together with switching elements Q of the pixels to be integrated.

The data driver 500 is connected to the data lines $D_1$-$D_m$ of the panel assembly 300 and applies data voltages selected from the gray voltages supplied from the gray voltage generator 800 to the data lines $D_1$-$D_m$.

The drivers 400 and 500 or a flexible printed circuit film (not shown) provided with the drivers 400 and 500 is disposed at a peripheral area outside the display area DA.

Panels 100 and 200 are maintained a constant distance apart by a spacer 320 and are sealed by a sealant 310. This is described in detail with reference to FIGS. 3 and 4.

Figure 3:
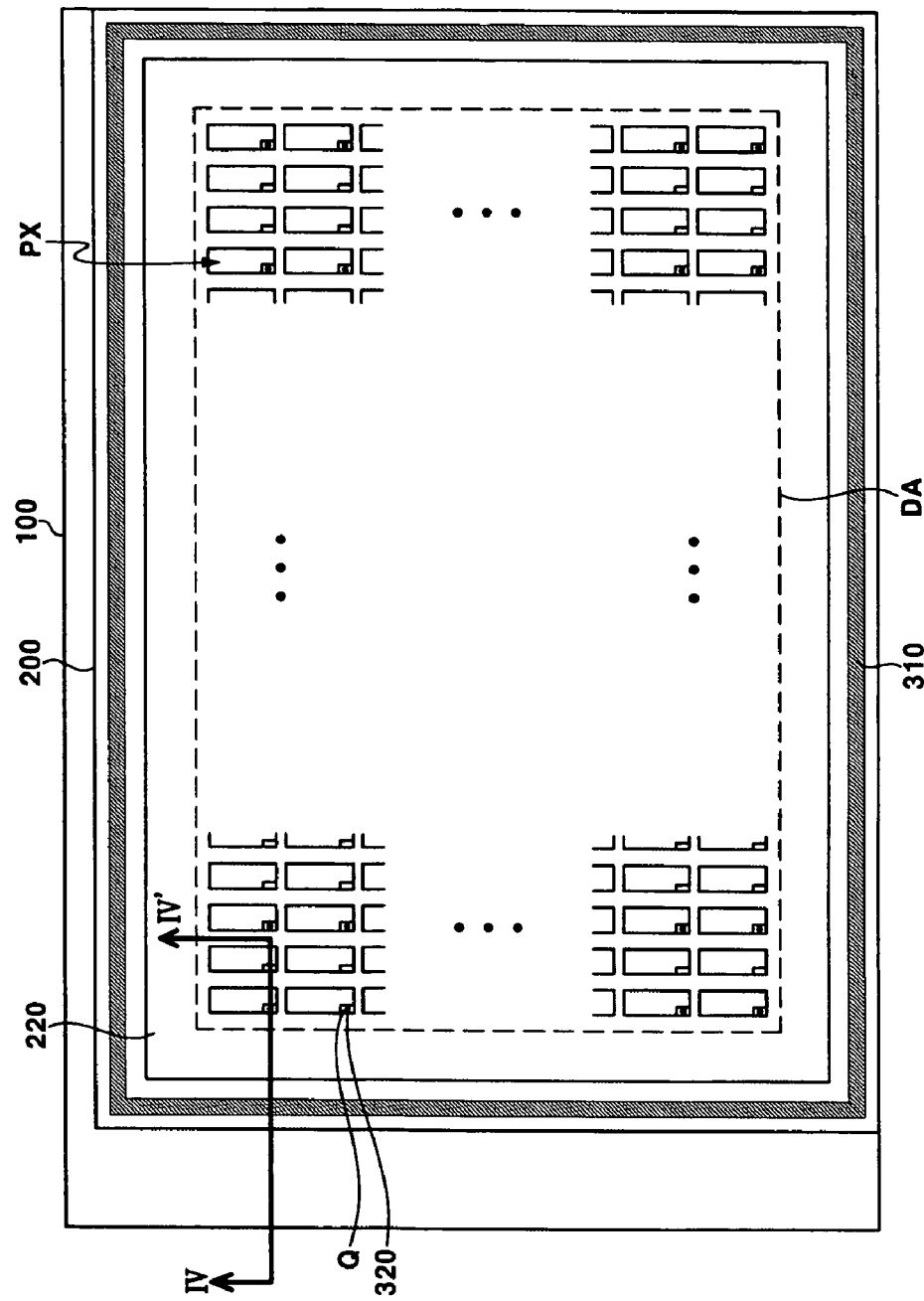
FIG. 3 is a plan view layout of an LCD according to an exemplary embodiment of the present invention.
Figure 4:
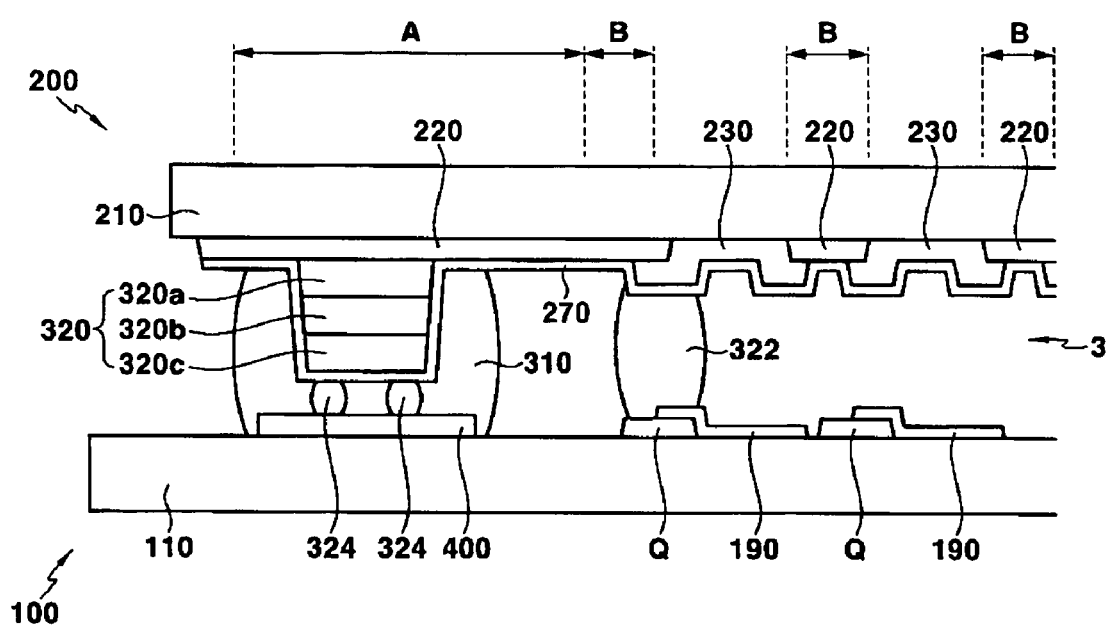
FIG. 4 is a cross-sectional view of the LCD shown in FIG. 4 taken along the line IV-IV'.

FIG. 3 is a schematic layout view of an LCD according to an exemplary embodiment of the present invention, and FIG. 4 is a sectional view of the LCD shown in FIG. 4 taken along the line IV-IV'.

A light blocking member 220 which is referred to as a black matrix for preventing light leakage is formed on an insulating substrate 210 of the color filter array panel 200. The light blocking member 200 has a plurality of openings facing the pixel electrodes 190 and the openings are shaped nearly identically to the pixel electrodes 190. The light blocking member 220 includes a first portion A formed around the edge of the display area DA. Portion A has a greater width than a second portion B which is formed in the display area DA. The light blocking member 220 may include portions facing the switching transistors Q.

The light blocking member 220 is preferably made of Cr, CrOx, or organics such as a black pigment. The light blocking member 220 may include a single layer or a plurality of layers.

A plurality of color filters 230 are formed in the openings of the light blocking member 220. Each of the color filters 230 face the pixel electrodes 190 and extend in a longitudinal direction and may represent one of three primary colors such red, green, and blue colors.

A first spacer 320 is formed on the first portion A of the light blocking member. The first spacer 320 is positioned above the gate driver 400. The first spacer 320 includes first to third layers 320a-320c, each of which is made of the same material as the color filter 230, that is, the same material as the color filters of red, green, and blue color that are sequentially deposited. The order of the deposition thereof may be varied depending on the order of the formation of the color filters 230.

Common electrode 270 is preferably made of a transparent conductor such as indium tin oxide (ITO) or indium zinc oxide (IZO) and is formed on the color filters 230 and the light blocking member 220.

An overcoat layer (not shown) may be formed between the common electrode 270 and the color filters 230, which prevents the color filters 230 from being exposed and provides a smooth surface.

An alignment layer (not shown) is formed on the common electrode 270, and second and third spacers 322 and 324, respectively, are formed on the alignment layer. The second spacer 322 is positioned above the switching element Q, and the number thereof is varied depending on the size of the panel 100. The third spacers 324 are formed on the first spacer 320 and are preferably made of the same material as the second spacer 322. The spacers 324 prevent the signal lines of the gate driver 400 and the common electrode 270 on the first spacer 320 from shorting due to contact thereof. The width of the third spacer 324 is formed sufficiently narrow so that the signal lines of the driver 400 do not overlap the third spacer 324. Thus, damage to the signal lines of the driver 400 is avoided.

When the common electrode 270 is formed on the lower panel 100, or the signal lines are not formed at portions corresponding to the first spacer 320, a short does not occur between the common electrode 270 and the signal lines of the driver 400 and thus the spacer 320 may be formed at the edge by only adjusting the thickness of the color filters 230.

A manufacturing method of a color filter array panel is described below with reference to FIGS. 5A and 5B, and FIG. 4.

Figure 5A:
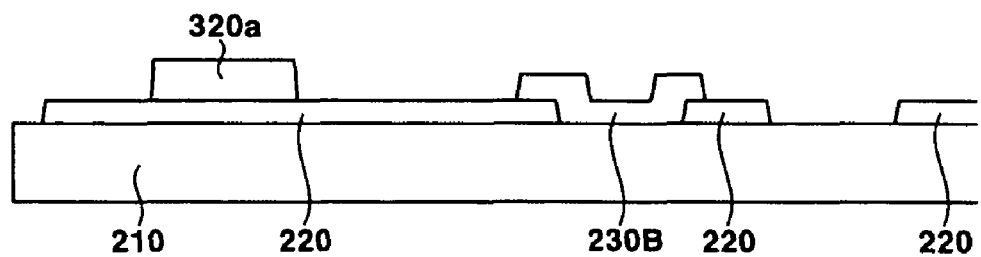
FIGS. 5A and 5B are sectional views of a color filter array panel for an LCD sequentially showing steps used to manufacture the array panel.
Figure 5B:
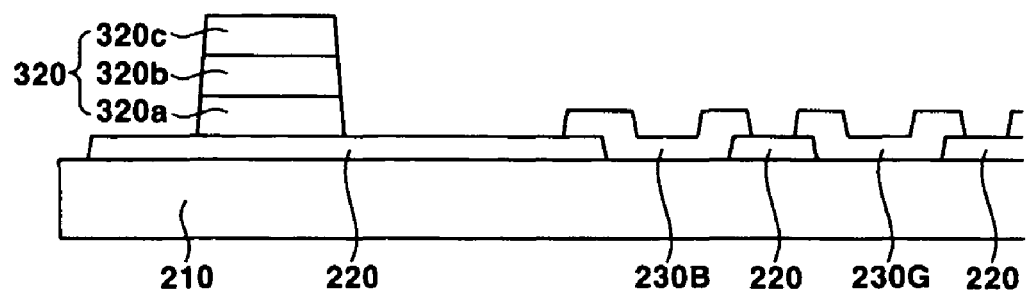

FIGS. 5A and 5B are sectional views of a color filter array panel for an LCD, sequentially showing the steps of a manufacturing method thereof.

Referring to FIG. 5A, a material having a good light-blocking characteristic such as Cr is deposited on an insulating substrate 210 using photolithography to form a light blocking member 220.

A photosensitive resin including a green pigment is coated by spin coating. The photosensitive resin is exposed to light and developed and then is hard-baked to form a blue color filter 230B and a first layer 320a of a first spacer 320.

Referring to FIG. 5B, a green color filter 230G and a second layer 320b of the first spacer 320 are formed using the same method as with the blue color filter 230B. Similarly, a red color filter and a third layer 320c are sequentially formed. The formation order of the red, the green, and the blue color filters may be varied.

Subsequently, referring to FIG. 4, a transparent conductive material such as ITO and IZO is deposited to form a common electrode 270 using sputtering.

An alignment layer (not shown) is formed on the common electrode 270.

An organic material such as negative photosensitive polymer is deposited on the alignment layer and is patterned to form second and third spacers 322 and 324. A height of the third spacers 324 is preferably less than that of the second spacer 322 which is achieved by using a slit or a translucent film.

According to embodiments of the present invention, since the spacers are formed by patterning the material used for the color filters, and separate spacers such as ball type spacers are not required. Accordingly the signal lines of the driver are not damaged by the ball type spacers, and the reliability of the LCD is improved.

A mixture process and a bubble-removing process for including the spacers in the sealant can be omitted to increase productivity of the LCD.

While the present invention has been described in detail with reference to the preferred embodiments, it is to be understood that the invention is not limited to the disclosed embodiments, but, on the contrary, covers various modifications and equivalent arrangements included within the sprit and scope of the appended claims.

What is claimed is:

1. A liquid crystal display comprising:
    a thin film array panel comprising a first substrate having a display area and a driver area which is intermediate on edge of the first substrate and the display area;
    gate lines formed in the display area;
    data lines intersecting the gate lines;
    thin film transistors connected to the gate lines and the data lines;
    pixel electrodes connected to the thin film transistors;
    at least one driver disposed on the driver area and connected to the gate lines;
    a color filter array panel comprising:
        a second substrate;
        a plurality of color filters formed at positions in the display area;
        a first spacer formed at a position corresponding to the driver area; and
        a common electrode formed on the color filters and the first spacer;
    a liquid crystal material interposed between the color filter array panel and the thin film array panel;
    a second spacer formed on the common electrode in the display area
    a third spacer formed on the first spacer;
    wherein the at least one driver is formed corresponding to the third spacer, and
    wherein a width of the third spacer is narrower than a width of the first spacer, and a signal line of the at least one driver does not overlap the third spacer.

2. The liquid crystal display of claim 1, further comprising a sealant overlapping at least a portion of the first spacer to seal the liquid crystal.

3. The liquid crystal display of claim 1, wherein each of the color filters represents one of red, green, and blue colors.

4. The liquid crystal display of claim 3, wherein the first spacer is comprised of a material having a composition corresponding to a composition of at least two materials of the red, the green, and the blue color filters.

5. The liquid crystal display of claim 1, further comprising a light blocking member formed between the panel and the color filters, the light blocking member including openings at locations which correspond to the color filters.

6. The liquid crystal display of claim 1, wherein the third spacer comprises at least two spacers.

7. The liquid crystal display of claim 1, wherein the third spacer comprises a material which is the same as a material of the second spacer.

* * * * *